US008720928B2

(12) United States Patent
Delpit et al.

(10) Patent No.: US 8,720,928 B2
(45) Date of Patent: May 13, 2014

(54) ADJUSTABLE RAKE AND HEIGHT TRIPLE TREE

(76) Inventors: Paul David Delpit, Charleston, SC (US); Charles Leonard Hudson, Johns Island, SC (US); David Kenneth Howlett, Charleston, SC (US)

( * ) Notice: Subject to any disclaimer, the term of this patent is extended or adjusted under 35 U.S.C. 154(b) by 126 days.

(21) Appl. No.: 12/931,569

(22) Filed: Feb. 4, 2011

(65) Prior Publication Data
US 2011/0204590 A1    Aug. 25, 2011

Related U.S. Application Data

(60) Provisional application No. 61/337,499, filed on Feb. 4, 2010.

(51) Int. Cl.
*B62K 21/22*   (2006.01)
*B62K 21/04*   (2006.01)

(52) U.S. Cl.
USPC .......................................... 280/279; 280/276

(58) Field of Classification Search
USPC ................................ 280/276, 279
See application file for complete search history.

(56) References Cited

U.S. PATENT DOCUMENTS

| | | | | |
|---|---|---|---|---|
| 3,556,557 A * | 1/1971 | Blair, III | ........................ | 280/279 |
| 3,866,946 A * | 2/1975 | Robison | ........................ | 280/279 |
| 4,565,384 A * | 1/1986 | Dehnisch | ........................ | 280/279 |
| 4,700,963 A * | 10/1987 | Burns et al. | ................... | 280/276 |
| 5,967,538 A * | 10/1999 | Callaluca et al. | ............. | 280/279 |
| 6,783,158 B2 * | 8/2004 | Nakagawa et al. | ........... | 280/785 |
| 7,360,963 B1 * | 4/2008 | Burns | ........................... | 403/177 |
| 7,438,306 B2 * | 10/2008 | Mrdeza et al. | ................ | 280/279 |
| 7,793,958 B2 * | 9/2010 | Lagar | ........................... | 280/279 |
| 7,938,422 B2 * | 5/2011 | Clari | ............................. | 280/280 |
| 2005/0223842 A1 * | 10/2005 | Dube et al. | ................... | 74/551.1 |
| 2006/0113745 A1 * | 6/2006 | Lagar | ........................... | 280/279 |

* cited by examiner

*Primary Examiner* — Joseph M Rocca
*Assistant Examiner* — Daniel Yeagley

(57) ABSTRACT

This invention allows motorcycle owner to easily change the rake and height of a motorcycle by the providing an upper tree assembly with spherical bearing connected by a center stem internally to the frame neck bearing housing. The lower tree assembly with a spherical bearing and an interchangeable degree rake puck being connected to the center stem. Tube extensions inserted into the motorcycle stock factory fork tubes and attached to the upper tree and lower tree allows height adjustments. A removable screw in the top of tube extensions inserted into a hollow bore through the center of tube extension allows service of the motorcycle fork tube hydraulic oil.

5 Claims, 8 Drawing Sheets

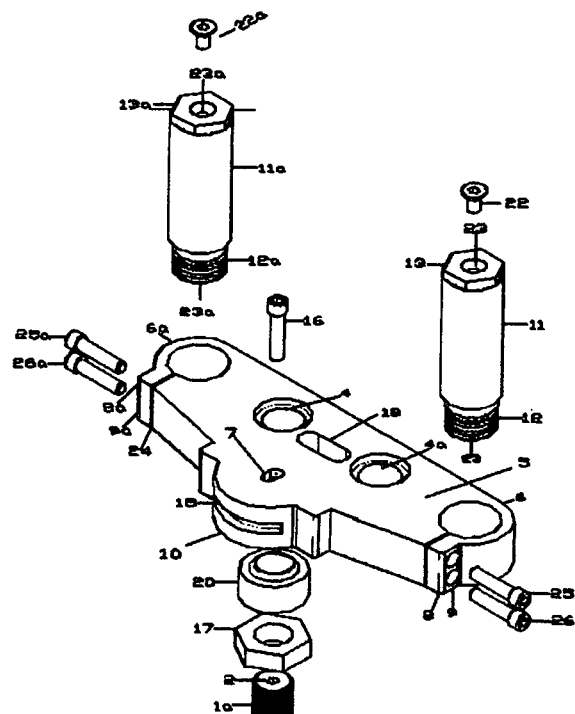
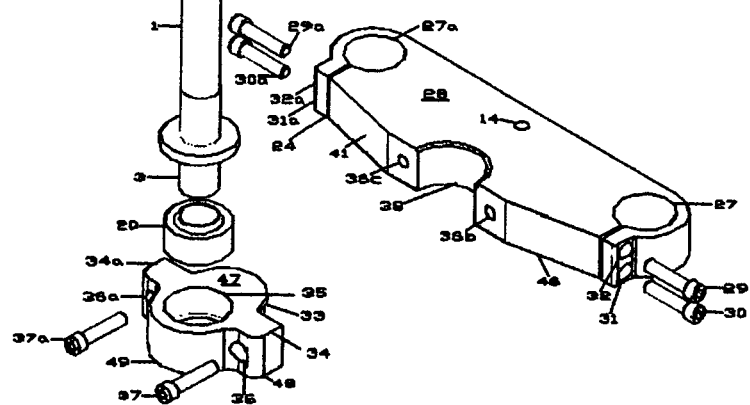
Fig.1

7 degree rack puck 3 degree rake puck 5 degree rake puck

ADJUSTABLE RAKE AND HEIGHT TRIPLE TREE

BACKGROUND OF THE INVENTION

This invention pertains to the steering portion of a motorcycle, which is comprised of triple trees, fork tubes, front wheel and handlebars. These parts are connected by a center bearing stem attached to the lower triple and attached to the steering housing on the motorcycle frame 3. The upper triple tree is attached to the top portion of the center stem held in place by a jam nut. The fork tubes are inserted up through mounting holes in the lower triple tree stopping at the upper triple tree. This arrangement holds the front wheel at an angular distance from the motorcycle frame at a fixed angle and height which cannot be easily changed.

This invention eliminates these issues and allows the motorcycle owner to avoid costly mechanical fees while maintaining stock factory aesthetic appearance.

SUMMARY OF INVENTION

As described in previous art, the challenges of the motorcycle owner to adjust front end rake and height, and service fork tube hydraulics while maintaining a stock factory appearance is resolved by this invention. This invention makes it possible for the owner to easily change the rake and height of the motorcycle front end. The rake is set with the use of a puck which is connected to the lower triple tree by two bolts. The puck can be interchanged with other pucks, each with a different set rake, by removing and reconnecting bolts to a lower triple tree. Exchanging pucks will change the angle of the front wheel to the frame as desired by the motorcycle owner. The owner can change the height of the motorcycle frame to the ground by loosening pinch bolts on the sides of the upper and lower triple trees. This allows the fork tubes to slide up or down, lowering or raising the front end. Once the desired front end height is achieved, pinch bolts are then tightened, height of the front end has been changed.

FIG. 1 is an exploded view of the triple tree assembly. The present invention consists of an upper tree with spherical bearing, lower tree with three interchangeable rake degree pucks and spherical bearing. Rake degree pucks allow the motorcycle owner to easily change the rake angle of the motorcycle. Two fork tube extensions with fill holes are installed into the top of motorcycles owners stock fork tubes and allow the height adjustment and service of hydraulic fork tube oil. There is a center stem for attaching triple trees to motorcycle steering section. Parts of this invention are better understood by referencing the drawings and the text description provided. They will clearly point out the inherent advantages of this invention.

BRIEF DESCRIPTION OF DRAWINGS

FIG. 1 is an exploded view of the triple tree assembly.

DETAILED DESCRIPTION OF INVENTION

Figure 2:
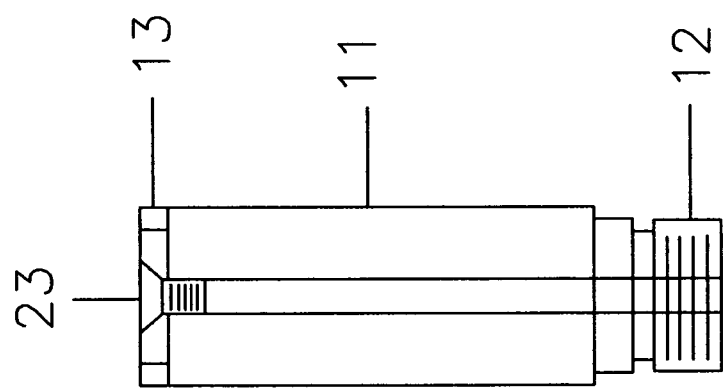
FIG. 2 is a side view of fork tube extension.
Figure 3:
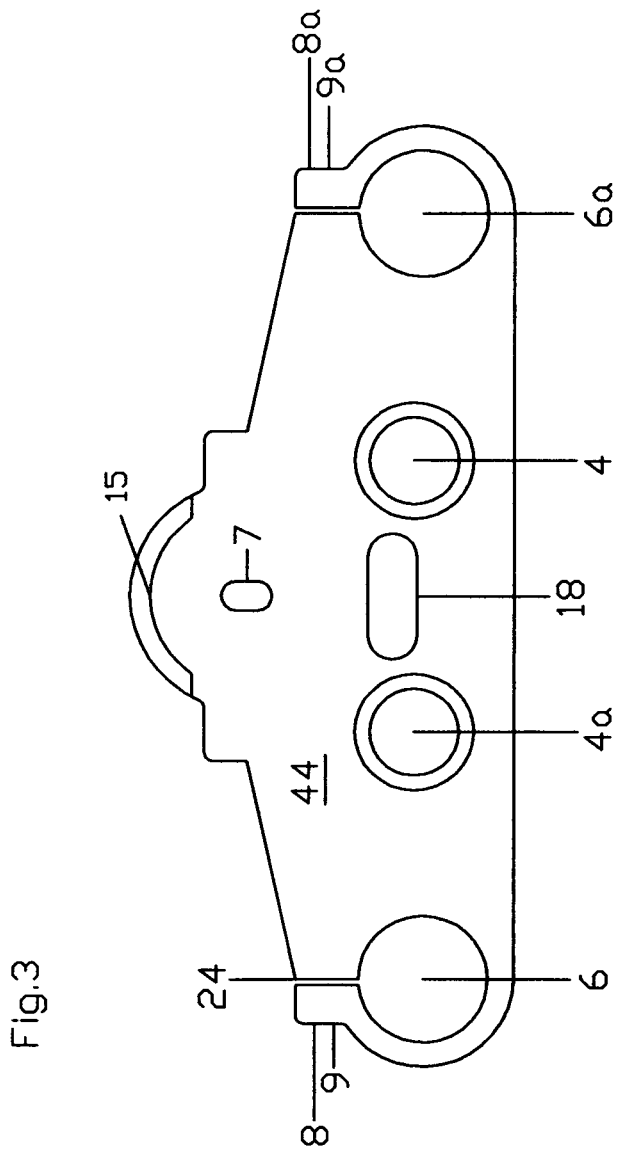
FIG. 3 is a top view of upper triple tree.
Figure 4:
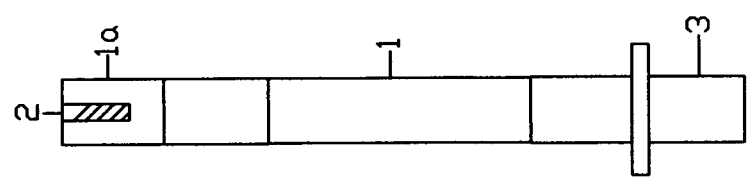
FIG. 4 is a side view of center stem.
Figure 5:
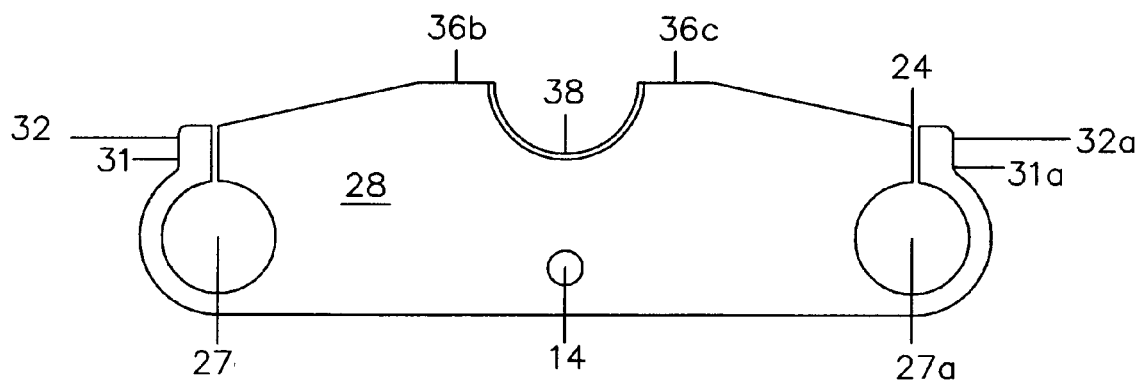
FIG. 5 is a top view of lower triple tree.
Figure 6:
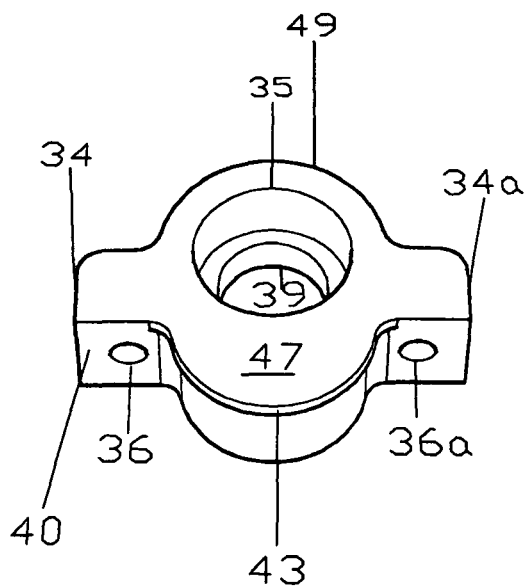
FIG. 6 is a top view of a seven degree rake puck.
Figure 6A:
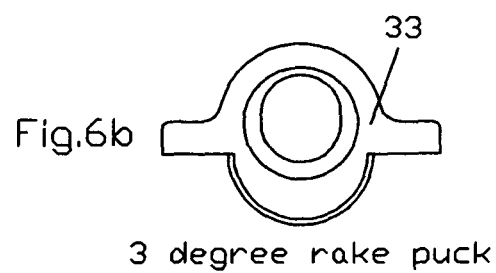
FIG. 6*a* is a top view of a five degree rake puck.
Figure 6B:
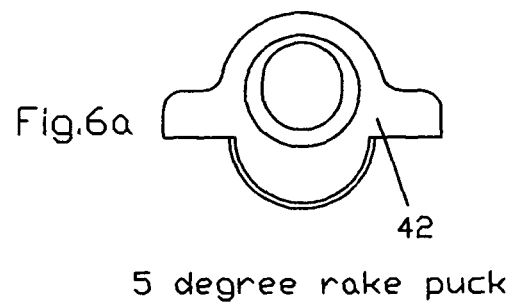
FIG. 6*b* is a top view of a three degree rake puck.
Figure 7:
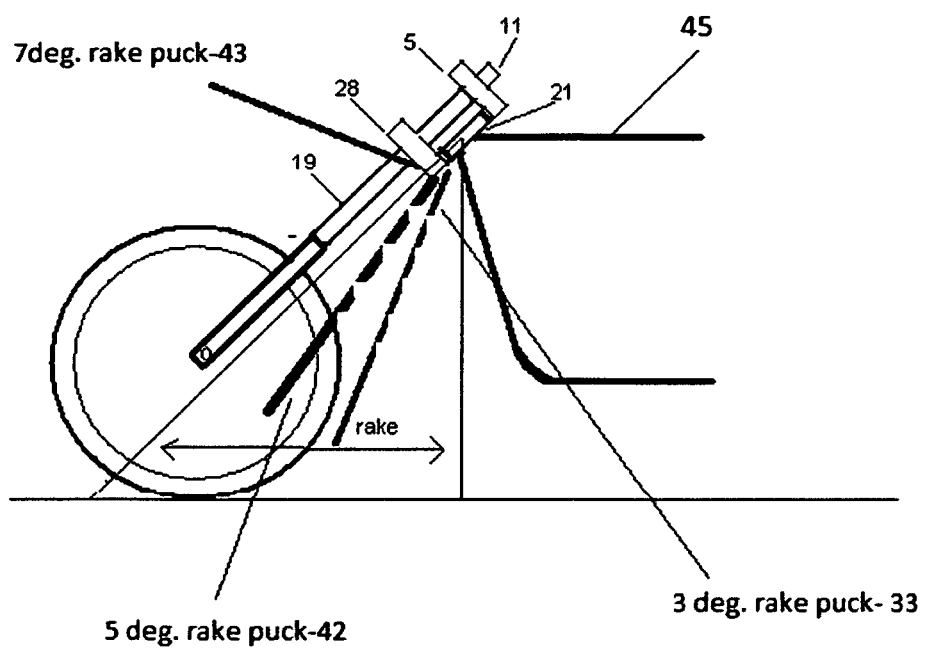
FIG. 7 is a schematic view of a motorcycle fork tree assembly and motorcycle frame.

Utilizing drawings in detail where like components are specified by like numbers, the invention of an adjustable rake and height triple tree set is shown in detail. A motorcycle front end assembly consisting of a front wheel, axle, fork tubes, an upper tree, lower tree and center stem. These components are then attached to motorcycle frame at the neck bearing housing portion. By changing the angular relationship of the front end assembly to the neck bearing housing increases or decreases the rake. Likewise height is typically adjusted by mechanically changing the fork tubes to different length tubes, this is timely and expensive. This invention allows the motorcycle owner to adjust the height by loosening pinch bolts on the upper and lower trees and sliding the fork tubes up or down. The parts as described in the following text and drawings explain how rake and height adjustments can now be varied by the motorcycle owner without compromising the stock factory aesthetic appearance.

Center stem 1 is installed with threaded end 1*a* up through bottom side of neck bearing frame housing 21 at upper front portion of motorcycle frame 45. Center stem 1 is attached by engaging jam nut 17 to threaded end 1*a* of center stem 1. Lower triple tree 28 consisting of a flat rectangular plate, rounded at opposite ends with cylindrical openings 27 and 27*a*, also having a thru hole 14 from top to bottom of lower tree 28 for motorcycle headlight mounting. Rake puck 33 mounting holes 36*b* and 36*c* are threaded into lower tree 28 to install and remove rake pucks 33, 42 and 43. By interchanging these is how the rake of the bike is changed. Motorcycle owners fork tubes and tube extensions 11 and 11*a* are inserted up through fork tube hole openings 27 and 27*a* from bottom surface 46 of lower triple tree 28 plate is secured to motorcycle owners fork tubes 19 by tightening socket head bolts 29 and 30 and 29*a* and 30*a* that are passed through horizontal countersunk holes 31 and 32 and 31*a* and 32*a*, through open slot 24 and inserted into horizontal threaded holes, thus attaching lower triple tree 28 plate to fork tube assembly 19 of motorcycle. Fork tube extensions 11 and 11*a* are installed into top of motorcycle owner's fork tubes 19 by inserting threaded end 12 and 12*a* of extensions 11 and 11*a* into top threaded opening of motorcycle owners fork tubes 19 and tightened by using wrench on flat areas 13 and 13*a*. Flathead screw 22 and 22*a* is inserted into threaded through hole 23 and 23*a* at top of tube extensions 11 and 11*a*. Removal and replacement of this flathead screw 22 and 22*a* allows motorcycle owner to service hydraulic oil without costly mechanical service fees. Upper tree plate 5 consisting of a flat rectangular shape and rounded at opposite ends with cylindrical openings 6 and 6*a* to allow motorcycle owners fork tubes 19 to insert up through the openings vertically and two cylindrical openings 4 and 4*a* to install handlebars for steering. There is an elongated slot 18 located between 4 and 4*a* for motorcycle harness to pass through. Fork stop opening 15 in upper tree plate 5 is to allow for the motorcycle front end to stop traveling too far right or left when on motorcycle kickstand. Spherical bearing 20 is installed into spherical bearing hole opening 10 at bottom surface 44 of upper triple tree 5. Upper tree plate 5 is mounted to top threaded end 1*a* of center stem 1 by inserting top threaded end 1*a* into spherical bearing 20 at bottom side bearing location 10 of upper tree plate 5. It is secured by flathead screw 16 inserted through top side elongated countersunk slot opening 7 into threaded hole 2 in top of center stem 1. Motorcycle fork tubes 19 are attached to upper triple tree plate 5 by tightening socket head bolts 25 and 26 and 25*a* and 26*a* that are passed through horizontal countersunk holes 8 and 9 and 8*a* and 9*a*, through open slot 24 and inserted into horizontal parallel threaded holes, thus attaching upper triple tree plate 5 to motorcycle front assembly.

Any of the rake degree pucks 33, 42, 43 each consisting of top surface 47 and bottom surface 48 of eccentric cylindrical shape with dimensional horizontal flat elongations 34 and 34a on right and left sides equidistant to center bearing hole opening 35 in top surface. Dimensional horizontal flat elongations 34 and 34a have parallel holes 36 and 36a through the center of flat elongations. These parallel hole openings 36 and 36a run horizontally from back side 49 to front side 40 of elongations 34 and 34a to allow rake degree puck 33, 42, 43 with socket head bolts 37 and 37a to mount to lower triple tree 28 at 180 degree machined semi-circle opening 38 in rear side 41 of lower triple tree 28 plate. The center hole opening 35 has a dimensional depth from top surface 47 of rake puck 33 to bottom surface 48. The bottom surface 48 of rake puck 33 has an elongated opening 39 through dimensional depth from front side 40 to back side 49 of center hole opening 35. Spherical bearing 20 is inserted into center hole opening 35 of rake degree puck 33 which is mounted to bottom end 3 of center stem 1 which is attached to neck bearing frame housing 21. The degree puck 33 is then attached to lower triple tree plate 28. The rake is now changed to a dimensional degree designated by the rake degree puck 33, by simply interchanging additional degree rake pucks 42 or 43 at lower triple tree plate 28. This now mounts lower tree 28 to motorcycle frame 45. With this invention the motorcycle owner now has the ability to change the height and rake and service the hydraulic fork tube oil himself without costly mechanical service fees, while maintaining the stock factory aesthetic appearance and using motorcycle owners fork tube assembly.

We claim:

1. An adjustable rake and height triple tree working in tandem with a motorcycle frame, having neck bearing housing attached to an upper forward steering section of said frame, said neck bearing housing being a hollow tube with an open upper and lower end and internal bearings, said adjustable rake and height triple tree comprising:

an upper tree assembly comprising at least one spherical bearing of said internal bearings of said neck bearing housing and a fork stop opening;

a lower tree assembly with an interchangeable rake degree puck comprising; one of a group of rake pucks consisting of a 3 degree rake puck, a 5 degree rake puck, and a 7 degree rake puck;

two fork tube extensions, each having a hollow bore;

a solid center stem connecting said upper tree assembly and said lower tree assembly;

wherein said upper tree assembly is mounted above said neck bearing housing and said lower tree assembly is mounted below said neck bearing housing;

wherein said fork tubes are attached on each side of a front wheel with an axle through a center of said front wheel;

wherein said upper tree assembly comprises an elongated flat plate with a top surface and a bottom surface with a dimensional thickness and length, with rounded ends terminating with a flat area and continuing towards a back center of said upper tree at an angular direction terminating with an obtuse lobe to be located directly over said center stem;

wherein said flat plate comprises two parallel holes from said top surface to said bottom surface equally positioned to a vertical plane on a right and left side of said front wheel, said two parallel holes having an open slot from a backside of said upper plate to a circumference of each of said parallel holes and said top surface to said bottom surface;

said upper tree assembly further comprises horizontal parallel holes through said flat area and said open slot and into said upper tree at which point, each said horizontal parallel holes are threaded at a dimensional depth to allow for tightening a bolt in each horizontal hole of said horizontal parallel holes and securing said upper tree to said fork tubes by each bolt being inserted through said horizontal parallel holes positioned on said flat area equidistance to a vertical plane of said flat area; and an elongated opening is positioned forward and center of said upper plate from said top surface to said bottom surface for an electrical wiring harnesses to pass through; and positioned on opposing sides from said wiring harness elongated opening are two handle bar holes from said top surface to said bottom surface to serve as handle bar mounts, said upper plate having said obtuse lobe at said back center of said upper plate directly over a location of said center stem in said neck bearing housing, said obtuse lobe has a cylindrical hole opening from said bottom surface towards said top surface stopping at a dimensional distance leaving a thickness of material at a point, said thickness of material will serve as said fork stop opening of said upper tree assembly for said at least one internal spherical bearing of said neck bearing housing when installed, said upper tree assembly further comprises a slot opening positioned over said center of said cylindrical hole opening through said top surface and said thickness of material to allow access for a mounting screw for securing said upper plate to said center stem on said backside of said obtuse lobe, wherein centered between said top surface to said bottom surface is an elongated fork stop opening positioned from said backside of said obtuse lobe through to said cylindrical hole opening of said obtuse lobe having a dimensional circumference distance for said elongated fork stop opening to serve as a fork stop.

2. The adjustable rake and height triple tree according to claim 1, wherein said lower tree assembly consisting of: a tree plate laterally elongated with a top surface and a bottom surface, a front and a rear with a dimensional thickness and rounded ends, wherein the rounded ends are terminating in a flat area on said rear of said lower tree plate and continuing from said flat area in an angular direction toward a rear center of said tree plate, wherein each rounded end terminating with an elongated flat area on each side of a 180 degree open semi-circumference on said rear of said tree plate at said rear center of said tree plate, wherein said open semi-circumference from said top surface to said bottom surface of said tree plate extends towards said front of said tree plate and terminating at a dimensional distance towards said front of said tree plate, said top surface of said 180 degree semi-circumference is countersunk towards said bottom surface to form a ridge, said elongated flat area terminating on each side of said 180 degree open semi-circumference have a horizontal threaded hole at a center of said elongated flat area on each side of said 180 degree open semi-circumference, two parallel holes are centered between said front of said tree plate and said 180 degree open semi-circumference with open holes from said top surface of said lower tree assembly tree plate to said bottom surface of said tree plate; wherein said two parallel holes of said tree plate are equally positioned to said vertical plane on said right and said left side of said front wheel of said motorcycle frame, wherein said parallel holes of said lower tree plate have an open slot from a backside of said lower tree plate to a circumference of each hole of said parallel holes of said tree plate and from said top surface to said bottom surface of said lower tree plate, each said open slot of said lower tree plate comprise horizontal parallel holes through said elongated flat area and said open slot of said tree plate and into said lower tree at which point said horizontal parallel holes are threaded at a dimensional depth to allow for tightening bolts and securing said lower tree to said fork tubes inserted through said parallel holes of said lower tree assembly equidistance to said vertical plane.

3. The adjustable rake and height triple tree according to claim 2, wherein said rake puck of said group of said rake pucks comprise a top surface and a bottom surface, a front and a back, and a dimensional thickness, with said front and back of said puck having a longitudinal eccentric shape, an elongated flat on each side of said puck from said top surface of said puck to said bottom surface of said puck equidistant apart, wherein each puck of said group of pucks comprise open horizontal holes from said front of said puck to said back of said puck to allow mounting of said puck to said lower tree assembly of said adjustable rake and height triple tree, each said puck of said group of pucks comprise a cylindrical hole opening from said top surface of said puck towards said bottom surface of said puck stopping at a dimensional distance from said bottom surface leaving a thickness of material at a point, wherein said thickness of said cylindrical hole opening of said puck will serve as a stop for a second spherical bearing of said internal bearings, each said puck from the said group of pucks comprise a 180 degree semi-circumference at said front of said puck with a front side of said front of said puck towards said back of said puck creating a flanged area having elongated flats on each side of said semi-circumference creating a dimensional thickness from said front side of said front of said puck towards said back of said puck creating by said flanged area having a length, wherein by increasing said length of said flange area between said front side of said front of said puck to said back of said puck between the three said pucks from the said group of pucks thereby increasing said dimensional thickness from the front side to the back of each said puck of said group of pucks, wherein the flanged area of each said puck from said group of said pucks have a dimensional thickness between a center of said cylindrical hole opening of said puck and said front side of said front of said puck from said elongated flats; such that each dimensional thickness of the group of said pucks changes a rake degree between the individual said group of pucks between the said 3 degree puck, said 5 degree puck and said 7 degree puck, thereby by interchanging said individual pucks to said flat area of said lower tree thereby moving the fork tube further out from said motorcycle frame and achieve a change in motorcycle rake.

4. The adjustable rake and height triple tree according to claim 3, wherein said fork tube extensions being a dimensional solid round cylindrical shape, with a top surface and a bottom surface, an open hole through a center with a threaded dimensional distance from said top surface of said fork tube extension to said bottom surface of said fork tube extension, a flathead countersink screw at said top surface of said fork tube extension over said open hole through said center, said top surface has six dimensional flats from said top surface towards said bottom surface of said fork tube extensions at a dimensional thickness, any directly opposing said dimensional flats are parallel and dimensional distant apart, said bottom surface towards said top surface of said fork tube extensions is threaded a dimensional distance to allow said fork tube extensions to be installed into a motorcycle owners fork tubes, said open hole through said center of said fork tube extension allows service of fork tube hydraulic oil.

5. The adjustable rake and height triple tree according to claim 4, wherein said center stem comprises an elongated solid round shaft with a top end and a bottom end, said top end of said stem is threaded from said top end towards said bottom end at a dimensional distance, said bottom end towards said top end has a smooth machined diameter at a dimensional distance terminating at a much larger diameter with a bottom surface, a thickness, and a top surface, said top end of said center stem has threaded hole in a center diameter of said stem to accept a flathead screw of said mounting screw to locate said internal spherical bearing over said center stem, said threaded top end is inserted up through said open lower end of said neck bearing housing through said internal bearings and out said open upper end of said neck bearing housing and secured by a jam nut, wherein said center stem is attached to said steering section of said motorcycle frame.

\* \* \* \* \*